United States Patent [19]

Okumura et al.

[11] Patent Number: 5,756,600
[45] Date of Patent: May 26, 1998

[54] URETHANE-MODIFIED EPOXY VINYL ESTER RESIN

[75] Inventors: Hiroya Okumura; Toshiaki Uchida, both of Fujisawa; Koichi Akiyama, Kamakura; Kenichi Morita, Fujisawa; Takashi Shibata, Kamakura, all of Japan

[73] Assignee: Takeda Chemical Industries, Ltd., Osaka, Japan

[21] Appl. No.: 694,688

[22] Filed: Aug. 9, 1996

[30] Foreign Application Priority Data

Aug. 11, 1995 [JP] Japan .................................. 7-227576

[51] Int. Cl.$^6$ .............................. C08K 3/22; C08K 7/14; C08L 63/10
[52] U.S. Cl. .................... 525/528; 428/288; 428/290; 523/457; 523/466; 523/467; 525/111; 525/502
[58] Field of Search .................. 525/528, 111, 525/502; 523/457, 466, 467; 428/288, 290

[56] References Cited

U.S. PATENT DOCUMENTS

| | | | |
|---|---|---|---|
| 4,293,659 | 10/1981 | Svoboda | 523/500 |
| 5,304,586 | 4/1994 | Hammesfahr et al. | 523/117 |
| 5,495,029 | 2/1996 | Steinmann et al. | 560/158 |

FOREIGN PATENT DOCUMENTS

| | | |
|---|---|---|
| 54-22498 | 2/1979 | Japan . |
| 57-115415 | 7/1982 | Japan . |
| 62-184011 | 8/1987 | Japan . |
| 3-56522 | 3/1991 | Japan . |

OTHER PUBLICATIONS

"SCRIMP Stars at SPI", Reinforced Plastics, vol. 4, pp. 62–68, Apr. 1996.

*Primary Examiner*—Robert E. Sellers
*Attorney, Agent, or Firm*—Wenderoth, Lind & Ponack

[57] ABSTRACT

A composition useful as a sheet or bulk molding compound comprises a urethane-modified vinyl ester resin (A), or acid-addition vinyl ester resn (A') obtained by reacting the hydroxyl groups in (A) with a polybasic acid anhydride (B), and a double bond(s)-containing monomer (C), wherein (A) is prepared by reacting a vinyl ester resin (F) derived from the reaction of an epoxy resin (D) and an unsaturated monobasic acid (E), with a polyisocyanate (H) and, optionally, a hydroxyl group(s)-containing (meth)acrylate (G) in an isocyanate:hydroxyl groups equivalent ratio of from 0.01–1.2:1.

10 Claims, No Drawings

URETHANE-MODIFIED EPOXY VINYL ESTER RESIN

BACKGROUND OF THE INVENTION

The present invention relates to a novel vinyl ester resin composition and a cured product therefrom. More particularly, the invention relates to the vinyl ester resin composition which is high in productivity and gives a cured product excellent in heat resistance, toughness, corrosion resistance, water resistance, boiling water resistance, gloss and transparency, and the cured products therefrom.

DESCRIPTION OF RELATED ART

In recent years, cured products from vinyl ester resin compositions have been used in various fields because of their excellent heat resistance, toughness, corrosion resistance, water resistance, boiling water resistance, gloss, transparency and so on.

When the resin compositions are molded by compression or injection molding, the composition has to be thickened. However, the vinyl ester resin composition does not have any terminal carboxyl groups in its molecule and therefore, it can not be thickened with oxides of alkaline earth metals such as magnesium oxides as proposed in JP Kokoku S40(1965)-273.

A technique to thicken a resin composition by mixing a vinyl ester resin which does not have any functional groups participating in the thickening and an unsaturated polyester resin which has carboxyl groups participating in the thickening, and to mold the composition by compression or injection molding was proposed in JP Kokai H4(1992)-23818. However, according to the above technique, the respective components in the mixed composition has a strong tendency to separate from each other, because the vinyl ester resin and the unsaturated polyester resin don't have good compatibility to each other by nature.

When a low molecular weight vinyl ester resin which does not participate in the thickening is incorporated in a larger amount, the composition can not be thickened properly and can not give a product having excellent characteristics which the vinyl ester resin has by nature because of separation of the components in the composition.

Though a vinyl ester resin with terminal carboxyl groups has been known, this type of the vinyl ester resin does not have sufficient molecular weight to be thickened moderately.

For the above reasons, the vinyl ester resin which gives a cured product having its intrinsic characteristics mentioned above by compression or injection molding has not been obtained yet.

On the other hand, the vinyl ester resin has been molded by the cast molding method in some applications, but the resin does not have enough amount of double bonds to increase the degree of crosslinking and therefore, it takes a long time to cure the resin composition. In other words, it is low in productivity. Moreover, the cured product is insufficient in heat resistance which is one of the intrinsic characteristics of the vinyl ester resin.

The present inventors have conducted research work for vinyl ester resins whose degree of crosslinking can be easily raised while keeping its viscosity low when cured by cast molding, and can be thickened with oxides of alkaline earth metals when cured by compression or injection molding, and give the cured product excellent in heat resistance, corrosion resistance, water resistance, toughness, boiling water resistance, gloss and transparency and so on by the both molding methods.

SUMMARY OF THE INVENTION

The present inventors have overcome the problem in the case of cast molding of the resin by allowing to react the hitherto-known vinyl ester resin with isocyanate components to give higher molecular weight compounds, as well as solved the problem in the case of compression or injection molding of the resin by subjecting hydroxyl groups in the highly molecularized urethane modified vinyl ester resin to addition reaction with a polybasic acid anhydride.

Thus, the present invention relates to:

(1) A vinyl ester resin composition comprising;

(A): a urethane modified vinyl ester resin, or (A'): a urethane modified acid addition vinyl ester resin obtained by the reaction of a part or all of hydroxyl groups in (A) with (B): a polybasic acid anhydride, and (C): a reactive monomer having at least one double bond in its molecule, said (A) being prepared by reacting (F): a vinyl ester resin obtained by subjecting (D): an epoxy resin having 1.2 or more of an average number of epoxy groups in its molecule to addition reaction with (E): unsaturated monobasic acid and/or (G): (meth)acrylate having at least one hydroxyl group in its molecule with (H): a polyisocyanate component having 1.5 or more of an average number of polyisocyanate groups in its molecule, under the reaction conditions that an equivalent ratio of isocyanate groups in (H) to the total of hydroxyl groups in (F) and (G) is (i.e. NCO/OH) 0.01–1.2:1.

(2) The vinyl ester resin composition of (1), wherein (D) is one having 1.5 to 3 of an average number of epoxy groups in its molecule.

(3) The vinyl ester resin composition of (1), wherein the epoxy group in (D) is glycidyl group.

(4) The vinyl ester resin composition of (1), wherein (D) is a bisphenol type epoxy resin.

(5) The vinyl ester resin composition of (1), wherein (H) is one having 2 to 3.5 of an average number of isocyanate groups in its molecule.

(6) The vinyl ester resin composition of (1), wherein (E) is acrylic acid or methacrylic acid.

(7) The vinyl ester resin composition of (1), wherein (G) is hydroxymethyl (meth)acrylate, hydroxyethyl (meth)acrylate, hydroxypropyl (meth)acrylate or glycerin di(meth)acrylate.

(8) The vinyl ester resin composition of (1), wherein the resin composition further contains additives such as 0.1 to 5.0 parts by weight of a curing catalyst, 0.01 to 10 parts by weight of an internal mold release agent and 0 to 400 parts by weight of a filler relative to 100 parts by weight of the vinyl ester resin composition.

(9) A sheet or bulk molding compound which comprises impregnating glass fiber with the vinyl ester resin composition claimed in (1) which further contains 0.1 to 5 parts by weight a curing catalyst, 0.01 to 10 parts by weight of an internal mold release agent, 0 to 400 parts by weight of a filler and 0.2 to 10 parts by weight of a thickening agent relative to 100 parts by weight of the vinyl ester resin composition.

(10) A cured product obtained by curing the vinyl ester resin composition of (1), (8) or (9).

DETAILED DESCRIPTION OF THE INVENTION

First of all, (F): vinyl ester resin is prepared by reacting (D): epoxy resin having 1.2 or more of an average number of epoxy group in a molecule with (E): unsaturated monobasic acid.

As (D): epoxy resin used in the invention, there may be mentioned bisphenolic type epoxy resin, epoxy novolak type resin exemplified by phenolic novolak, cresolic novolak, aliphatic, alicyclic or monocyclic epoxy resin, amine type epoxy resin, copolymerized epoxy resin and the like. The bisphenolic type epoxy resin includes bisphenol A type epoxy resin having 2 glycidyl groups in its molecule, for example, Epotohto YD 128, YD 011, YD 014, YD 017, YD 901 and YD 904 produced by Tohto Kasei Co. Ltd., Epikote 828, 1001, 1004 and 1007 produced by Yuka Shell Epoxy Kabushiki Kaisha, ELA 128, ESA 011, ESA 014 and ESA 017 produced by Sumitomo Chemical Co. Ltd., and the like, bisphenol F type epoxy resin having 2 glycidyl groups in its molecule, for example, Epotohto YDF 170 and YDF 2001 produced by Tohto Kasei Co. Ltd., Epikote 807 produced by Yuka Shell Epoxy Kabushiki Kaisha, bisphenol S type resin having 2 glycidyl groups in its molecule, for example, EBSP-300 produced by Nippon Kayaku Co. Ltd., brominated bisphenol A type epoxy resin having 2 glycidyl groups in its molecule, for example, Epotohto YDB 400, YDB 406, YDB 412 produced by Tohto Kasei Co. Ltd., Epikote 5050 and 5051 produced by Yuka Shell Epoxy Kabushiki Kaisha, Sumiepoxy ELB 240 and 250 produced by Sumitomo Chemical Co. Ltd., and the like. The phenolic novolak type epoxy resin includes, among others, Epotohto YDPN 638 produced by Tohto Kasei Co. Ltd., Epikote 152 and 154 produced by Yuka Shell Epoxy Kabushiki Kaisha, EPPN 201 and BREN produced by Nippon Kayaku Co. Ltd., and the like.

The cresolic novolak type epoxy resin includes, among others, Epotohto YDCN 701, YDCN 702, YDCN 703 and YDCN 704 produced by Tohto Kasei Co. Ltd., Sumiepoxy ESCN 195 HH and 220 HH produced by Sumitomo Chemical Co. Ltd., and the like.

The aliphatic type epoxy resin includes, among others, hydrogenated bisphenol A type epoxy resin having 2 glycidyl groups in its molecule, for example, Epotohto ST-1000 and ST-3000 produced by Tohto Kasei Co. Ltd., and the like, propyleneglycol polyglycidyl ether having 1 to 2 glycidyl groups in its molecule, pentaerythritol polyglycidyl ether having 1 to 4 glycidyl groups in its molecule and the like.

The alicyclic epoxy resin includes, among others, alicyclic diepoxyacetal, dicyclopentadiene dioxide and vinylcyclohexene dioxide and the like, which have 2 epoxy groups in its molecule. The epoxy resin having one epoxy group in its molecule includes vinylhexene monoxide, glycidyl methacrylate and the like.

The monocyclic epoxy resin includes, among others, resorcinol diglycidyl ether, diglycidyl terephthalate and the like.

The amine type epoxy resin includes, among others, one having 4 glylcidyl groups in its molecule, for example, YH-434 produced by Tohto Kasei Co. Ltd. and the like.

The copolymerized epoxy resin includes a copolymer of glycidyl methacrylate and styrene, and the like.

These epoxy resins can be used alone or in combination. The average number of glycidyl groups in the molecule of the epoxy resin is 1.2 or more, preferably 1.2 to 4, and more preferably 1.5 to 3. Among these types of the epoxy resins, bisphenolic type, aliphatic, monocyclic and alicyclic epoxy resins are preferably used, and the bisphenolic type epoxy resin having a structure stable to corrosion is particularly preferable.

Though there are some types of bisphenolic type epoxy resins which have a different number of aromatic rings from each other, ones having 8 or less of the aromatic rings are preferably used in view of excellent corrosion resistance and heat resistance of the cured products.

As (E): unsaturated monobasic acid, there may be mentioned an unsaturated mono carboxylic acid, crotonic acid, cinnamic acid and the like, and a reaction product of a dibasic acid anhydride with an alcohol having at least one unsaturated group in its molecule, and the like. Examples of the dibasic acid anhydrides usable for the above reaction product includes, among others, aliphatic or aromatic dicarboxylic acid anhydride such as maleic anhydride, succinic anhydride, phthalic anhydride, tetrahydrophthalic anhydride, hexahydrophthalic anhydride. Examples of alcohols having an unsaturated group includes, among others, esters of acrylic or methacrylic acid and polyvalent alcohols such as hydroxyethyl (meth)acrylate, hydroxypropyl (meth) acrylate, hydroxybutyl (meth)acrylate, pentaerythritol tri (meth)acrylate, glycerin di(meth)acrylate and the like.

As (E): unsaturated monobasic acids, ones having 6 or less carbons and a chemical structure which does not have any ester groups of poor heat resistance and high water absorption is preferably used. Acrylic acid and methacrylic acid are used more preferably.

In the reaction of (D): epoxy resin and (E): unsaturated monobasic acid, equivalent ratio of (E): unsaturated monobasic acid to the epoxy group in (D): epoxy resin is preferably 0.8–1.2:1, and more preferably 0.9–1.1:1. In the above reaction, a polymerization inhibitor is preferably added to prevent (F): vinylester resin from gelling.

The polymerization inhibitor includes hydroquinone, parabenzoquinone, methylhydroquinone, catechol and the like which are conventionally employed in the preparation of unsaturated polyester resin and vinyl ester resin as polymerization inhibitors. Vinyl esterification catalysts are also advantageously employed to proceed the reaction of (D) and (E) quantitatively.

As the vinyl esterification catalyst, there may be mentioned various kinds of tertiary amines such as benzyldimethylamine, various kinds of quartenary ammonium chloride and the like, phosphorus containing compound such as triphenylphosphine and the like, salts of various kinds of metals inclusive of lithium and tin, which are conventionally used.

As (G): (meth)acrylate having a hydroxy group usable in the production of vinyl ester resin composition of this invention, there may be preferably mentioned (meth)acrylic esters such as 2-hydroxyethyl (meth)acrylate, hydroxypropyl (meth)acrylate, hydroxybutyl (meth)actylate which can be obtained by reacting unsaturated monocarboxylic acids such as acrylic acid and methacrylic acid with monoepoxy compound such as ethylene oxide, propylene oxide and the like, as well as glycerin di(meth)acrylate, pentaerythritol tri(meth)acrylate.

As the proportion of (G) to the mixture of (F) and (G) is higher, the number of double bonds is fewer, and the heat resistance of the cured product becomes poorer. Therefore, a content of (G) to be incorporated in the mixture is preferably less than 50% by weight, and when heat resistance of the cured product is highly required, its content is preferably less than 30% by weight.

(A): urethane modified vinyl ester resins are obtained by reacting (F): vinyl ester resin and/or (G): (meth)acrylate having a hydroxyl group in its molecule with (H): polyisocyanate component.

As (H): polyisocyanate component, there may be mentioned hitherto-known aromatic polyisocyanate compounds, aliphatic polyisocyanate compound inclusive of alicyclic and aromatoaliphatic polyisocyanate compounds, as well as the mixture of those polyisocyanates and monoisocyanate compounds.

Examples of the polyisocyanate compounds include aromatic polyisocyanates such as tolylene diisocyanate(TDI), phenylene diisocyanate(PDI), 4,4'-diphenylmethane diisocyanate(MDI), alicyclic polyisocyanates such as hydrogenated xylylene diisocyanate($H_6$XDI), isophorone diisocyanate(IPDI), hydrogenated 4,4'-diphenylmethane diisocyanate($H_{12}$MDI), and the like, aromatoaliphatic polyisocyanates such as xylylene diisocyanate(XDI), tetramethylxylylene diisocyanate(TMXDI), aliphatic polyisocyanates such as 1,6-hexamethylene diisocyanate(HDI).

An allophanate compound, biuret compound, trimer compound of those polyisocyanate compounds are also mentioned as a desirable examples. As monoisocyanate compounds, there may be preferably mentioned phenyl isocyanate, isocyanato ethylmethacrylate and m-isopropenyl α,α'-dimethylbenzylisocyanate.

The cured products obtained in this invention are excellent in appearance, transparency, color, water resistance, boiling water resistance and so on they can be preferably used as an artificial marble. In the production of the artificial marble of which appearance is regarded as important, so-called non-yellowing polyisocyanates such as IPDI, XDI, $H_6$XDI, TMXDI, $H_{12}$MDI, HDI and so on are desirably employed. An average number of functional groups in (H): isocyanate compound molecule may be 1.5 or more, preferably 1.5 to 4 and more preferably 2 to 3.5.

In the reaction of (F): vinyl ester resin and/or (G): (meth)acrylate having a hydroxyl group in the molecule with (H): polyisocyanate component, equivalent ratio of isocyanate groups to hydroxyl groups (NCO/OH) is in the range of 0.01–1.2:1, preferably 0.1–1.2:1, more preferably 0.3–1.1:1. A urethanation catalyst can be used to promote the reaction between isocyanate groups and hydroxyl groups.

Examples of the urethanation catalysts include known tertiary amines such as triethylamine, organic acid salts such as stannous octoate, dibutyltin dilaurate and organic metal compounds and the like.

Though (A): urethane modified vinyl ester resin may be mixed, as it is, with (C): reactive monomer having a double bond, it may also be mixed with (C) after allowing a part or all of hydroxyl groups in (A): urethane modified vinyl ester resin to react with (B): polybasic acid anhydrides to form (A'): urethane modified acid addition vinyl ester resin. When (A) is not have to be thickened with the oxides of alkaline earth metals and the like, it is not necessary to be modified with (B): polybasic acid anhydride, when (A) is required to be thickened adequately with the oxides of alkaline earth metals, 10%, more preferably, 25% of hydroxyl groups in (A) is modified with (B).

As (B): polybasic acid anhydrides used in this invention, there may be preferably mentioned saturated or unsaturated dicarboxylic acid anhydrides such as maleic anhydride, succinic anhydride, phthalic anhydride, tetrahydrophthalic anhydride, hexahydrophthalic anhydride and the like.

A catalyst is effectively used in the reaction of (A) and (B). When tertiary amine and quaternary ammonium salts are used, the reaction time may be shortened drastically. The reaction temperature is generally 50° to 160° C., preferably 80° to 120° C.

The use of (A'): urethane modified acid addition vinyl ester resin is particularly effective when the resin is thickened with alkaline earth metal oxide such as MgO in compression or injection molding, but when the thickening of the resin is performed with isocyanate compound by compression or injection molding or when the resin is cured by cast molding, (A') is not necessarily used.

The obtained (A) or (A') is mixed with (C): a reactive monomer having at least one double bond in its molecule (hereafter sometimes called as vinyl monomer).

As (C): the vinyl monomer, there may be mentioned unsaturated mono- and dicarboylic acids such as acrylic acid, methacrylic acid, itaconic acid, crotonic acid, fumanic acid, maleic acid, maleic anhydride and so on, unsaturated (meth)acrylates such as methyl (meth)acrylate, ethyl (meth) acrylate, propyl (meth)acrylate, butyl (meth)acrylate, 2-ethylhexyl (meth)acrylate, glycidyl (meth)acrylate, dodecyl (meth)acrylate and so on, nitriles such as (meth) acrylonitrile, amides such as (meth)acrylamide, N-methylol (meth)acrylamide, diacetone (meth)acrylamide, diethylaminoethyl (meth)acrylamide and so on, aliphatic vinyl compound such as vinyl-, propene- and butene chloride, aromatic vinyl compounds such as styrene, vinyl toluene, divinyl benzene, p-t-butylstyrene and so on, diene compounds such as butadiene, isoprene, chloroprene, pentadiene and so on, polyfunctional (meth)acrylates such as ethyleneglycol di(meth)acrylates, 1,4-butanediol (meth)acrylate, 1,6-hexanediol (meth)acrylate and so on. They can be used alone or in combination.

Though the mixing ratio of (A): urethane modified vinylester resin or (A'): urethane modified acid addition vinylester resin to (C): the vinyl monomer may optionally be determined, the content of the vinyl monomer in the composition is preferably in the range of 10 to 80 weight %, and more preferably 30 to 80 weight %.

In (A) or the mixture of (A') and (C), an additional (F): vinyl ester resin may be incorporated in a proportion of 5 to 45 parts by weight relative to the whole resin composition to give the resin composition with an improved workability without any sacrifice of the characteristics of the cured products.

The vinyl ester resin composition of this invention can be easily cured by adding a curing catalyst and, if desired, a curing accelerator conventionally used in the curing of unsaturated polyester resins and vinyl ester resins. The curing catalysts include organic peroxides such as methylethylketone peroxide, t-butyl peroxybenzoate, benzoyl peroxide, dicumyl peroxide and the like.

Usage amount of the catalyst to 100 parts by weight of the vinyl ester resin composition is generally 0.1 to 5.0 parts by weight, preferably 0.5 to 3.0 parts by weight.

The curing accelerator includes cobalt naphthate, cobalt octate, dimethyl aniline, diethyl aniline, acetyl acetone and the like. Usage amount of the curing accelerator to 100 parts by weight of the vinyl ester resin composition is preferably 0.01 to 3 parts by weight.

The vinyl ester resin composition of this invention can be molded to artificial marble as well as other cured materials in combination with the additives such as filler, low profile additives, curing agents, internal mold release agents, pigments, thickening agents, reinforcing fiber materials and the like.

The filler includes aluminum hydroxide, glass powder, calcium carbonate, talc, silica, clay, glass balloon and the like, and may be incorporated in an amount of 0 to 400 parts by weight relative to 100 parts by weight of the resin composition.

As the low profile additives, there may be mentioned saturated polyester, polymethyl methacrylate, polyvinyl acetate, crosslinked polystyrene, styrene-butadiene (block) copolymer and its hydrogenated products, vinylacetate-styrene (block) copolymer, (meth)acrylic-styrene (block) copolymer and the like, and they may be incorporated in the resin in an amount of 1 to 30 parts by weight relative to 100 parts by weight of the resin composition.

As the internal mold release agent, there may be mentioned metal soaps exemplified by zinc stearate, calcium stearate, organo silicon of fluorine compounds and phosphate compound and the like. Usage amount of the internal mold release agent to 100 parts by weight of the vinyl ester resin ranges 0.01 to 10 parts by weight.

Examples of the pigment include titanium oxides, carbon black, red iron oxide, phthalocyanine blue and so on.

The thickening agent includes oxide or hydroxide of magnesium and calcium.

For the reinforcing fiber material, use is made of glass fiber of generally 8 to 15µ in diameter and 50 mm or less in length.

In general, the usage amount of the reinforcing fiber material is about 1 to about 75% by weight relative to the whole molding compound.

The vinyl ester resin composition of this invention can be mixed with and impregnated into the components mentioned above according to the known method to form seats such as SMC and TMC, bulk molding materials such as BMC.

When the thickening agent is used, the composition is kneaded and impregnated, and then, before molding, is aged at a predetermined temperature for a predetermined time. The present vinyl ester resin composition can be cured by compression or injection molding and cast molding known per se to form the desired molded articles.

To facilitate understanding of this invention, preferred mode of the invention will be illustrated as follows.

EXAMPLE 1

Vinyl ester resin composition (a) was prepared by the following manner.

Into a 2 liter-four necked flask with a reflux condenser and a stirrer, 748 g of epoxy resin (YD 128, produced by Tohto Kasei Co. Ltd., epoxy equivalent: 187) and 344 g of methacrylic acid (produced by Mitsubishi Gas Chemical Company Inc.) were added in the presence of 1.0 g of hydroquinone and 1.0 g of benzyldimethylamine, and the mixture was heated at 120° C. to complete the reaction of epoxy groups.

After adjusting the temperature of the reaction mixture in the flask to 60° C., 0.3 g of dibutyltin dilaurate and 188 g of XDI (produced by Takeda Chemical Industries, Ltd.) were added thereto, followed by completion of the reaction of isocyanate groups.

To the reaction mixture, 98 g of succinic anhydride was added at 100° C. After completion of the reaction of the acid anhydride, 591 g of styrene was added followed by completion of the reaction to obtain vinyl ester resin composition (a).

The resin composition (a) was molded by compression molding and mechanical properties of the molded products were evaluated. The molding conditions were as shown below.

Into a 3 liter kneader were added 100 g of vinyl ester resin composition (a), 300 g of aluminum hydroxide (CWL 325B, produced by Sumitomo Chemical Co. Ltd.), 0.03 g of mono t-butylhydroquinone (MTBHQ), 0.5 g of t-butyl peroxybenzoate (Perbutyl Z, produced by NOF Corporation), 0.5 g of t-butyl peroxy 2-ethyl hexanoate (Perbutyl O, produced by NOF Corporation) and 4 g of zink stearate (ZNS-P, produced by Asahi Denka Kogyo KK.), and kneaded well.

To the obtained mixture were added 1 g of magnesium oxide (Magmic, produced by Kyowa Chemical Industries Co., Ltd.), 5 g of cross-linked polystyrene (Staphiloid GS 103, produced by Takeda Chemical Industries Ltd.) and 10 g of glass fiber (Chopped Strand, 1.5 mm in length) and the mixture was kneaded well.

The bulk molding compound (BMC) thus obtained was taken out of the kneader and aged at 40° C. for 3 days. The compound was kept standing at 120° C. for 7 minutes under a pressure of 10 MPa in a flat mold, 300×300×8 mm in size, to obtain test plates for evaluation of mechanical properties. The evaluation results are shown in [Table 1].

EXAMPLE 2

Resin composition (b) was prepared in a manner similar to the production process of vinyl ester resin composition (a) in Example 1 except that 288 g of acrylic acid was used instead of 344 g of methacrylic acid, and that 567 g of styrene was used.

Test plates for evaluation of mechanical properties were prepared in a manner similar to in Example 1 except that 300 g of aluminum hydroxide was employed instead of 350 g of that. The evaluation results are shown in [Table 1].

EXAMPLE 3

Test plates for evaluation of mechanical properties were prepared in a manner similar to in Example 1 except that 50 g of the composition (a) and 50 g of the composition (b) were employed instead of 100 g of the composition (a). The evaluation results are shown in [Table 1].

EXAMPLE 4

Test plates for evaluation of mechanical properties were prepared in a manner similar to in Example 1 except that 30 g of the composition (a) and 70 g of the composition (b) were employed instead of 100 g of the composition (a). The evaluation results are shown in [Table 1].

EXAMPLE 5

Test plates for evaluation of mechanical properties were prepared in a manner similar to in Example 1 except that 80 g of the composition (a) and 20 g of the composition (b) were employed instead of 100 g of the composition (a) and that 400 g of aluminum hydroxide was employed instead of 300 g of that. The evaluation results are shown in [Table 1].

EXAMPLE 6

A vinyl ester resin composition (c) and test plates for evaluation of mechanical properties were prepared in a manner similar to in Example 1 except that 98 g of tetrahydrophthalic anhydride was used instead of 98 g of succinic anhydride. The evaluation results are shown in Table 1.

EXAMPLE 7

A vinyl ester resin composition (d) and test plates for evaluation of mechanical properties were prepared in a manner similar to in Example 1 except that 98 g of maleic anhydride was used instead of 98 g of succinic anhydride. The evaluation results are shown in Table 1.

COMPARATIVE EXAMPLE 1

Test plates for evaluation of mechanical properties were prepared in a manner similar to in Example 1 except that 100 g of isophthalic acid type unsaturated polyester resin composition (Polymal 6316, produced by Takeda Chemical Industried, Ltd.) was employed instead of 100 g of the composition (a).

The evaluation results are shown in [Table 1].

EXAMPLE 8

Into a 2 liter-four necked flask with a reflux condenser and a stirrer, 374 g of epoxy resin (YD 128, produced by Tohto Kasei Co., Ltd., epoxy equivalent: 187) and 172 g of metacrylic acid (produced by Mitsubishi Gas Chemical Company Inc.) were added in the presence of 1.0 g of hydroquinone and 1.0 g of benzyldimethylamine, and the mixture was heated at 120° C. to complete the reaction of epoxy groups.

To the reaction mixture, 260 g of hydroxyethyl methacrylate (produced by Mitsubishi Gas Chemical Company Inc.) and 507 g of styrene monomer were added. After adjusting the temperature of the reaction mixture in the flask to 60° C., 0.3 g of dibutyltin dilaurate and 376 g of XDI (produced by Takeda Chemical Industries, Ltd.) were added thereto, followed by completion of the reaction of isocyanate groups and obtaining vinyl ester resin composition (e).

The resin composition was molded by cast molding and mechanical properties of the molded products were evaluated. The molding conditions were as shown below.

Into 100 g of the composition (e), 150 g of aluminum hydroxide (CWL 325B, produced by Sumitomo Chemical Co., Ltd.), 1.5 g of t-hexylperoxy 2-ethyl hexanoate (Percure HO, produced by NOF Corporation), and 0.5 g of bis(4-t-butylcyclohexyl) peroxydicarbonate (Percadox 16, produced by Kayaku Akzo Corporation) were added, kneaded well and then defoamed in vacuo.

The resin paste thus obtained was put in a flat mold, 300×300×8 mm in size and kept standing at 70° C. for 20 minutes, and at 90° C. for 60 minutes to obtain test plates for evaluation of mechanical properties. The evaluation results are shown in [Table 2].

EXAMPLE 9

The resin composition (f) was prepared in a manner similar to the production process of Example 8, except that 442 g of IPDI was used instead of 376 g of XDI and that 535 g of styrene monomer was used. The test plates were prepared in the same manner as in Example 8. The evaluation results are shown in [Table 2].

EXAMPLE 10

According to a manner similar to that of in Example 8, test plates for evaluation were prepared except that 30 g of the composition (e) and 70 g of the composition (f) were used instead of 100 g of the composition (e), and that 100 g of aluminum hydroxide was used instead of 150 g of that. The evaluation results are shown in [Table 2].

COMPARATIVE EXAMPLE 2

Test plates for evaluation of physical properties were prepared in a manner similar to in Example 8 except that 100 g of isophthalic acid type unsaturated polyester resin composition (Polymal 6316, produced by Takeda Chemical Industries, Ltd.) was employed instead of 100 g of the composition (e). The evaluation results are shown in [Table 2].

TABLE 1

Compression molding method

|  | Ex. 1 | 2 | 3 | 4 | 5 | 6 | 7 | Comp. Ex. 1 |
|---|---|---|---|---|---|---|---|---|
| Vinyl ester resin(a) | 100 |  | 50 | 30 | 80 |  |  |  |
| Vinyl ester resin(b) |  | 100 | 50 | 70 | 20 |  |  |  |
| Vinyl ester resin(c) |  |  |  |  |  | 100 |  |  |
| Vinyl ester resin(d) |  |  |  |  |  |  | 100 |  |
| Unsaturated polyester |  |  |  |  |  |  |  | 100 |
| Additives |  |  |  |  |  |  |  |  |
| Aluminum hydroxide | 300 | 350 | 300 | 300 | 400 | 300 | 300 | 300 |
| MTBHQ | 0.03 | 0.03 | 0.03 | 0.03 | 0.03 | 0.03 | 0.03 | 0.03 |
| Perbutyl Q | 0.5 | 0.5 | 0.5 | 0.5 | 0.5 | 0.5 | 0.5 | 0.5 |
| Perbutyl Z | 0.5 | 0.5 | 0.5 | 0.5 | 0.5 | 0.5 | 0.5 | 0.5 |
| Crosslinked polystyrene | 5 | 5 | 5 | 5 | 5 | 5 | 5 | 5 |
| Zinc stearate | 4 | 4 | 4 | 4 | 4 | 4 | 4 | 4 |
| Glassfiber | 10 | 10 | 10 | 10 | 10 | 10 | 10 | 10 |
| Magnesium oxide | 1 | 1 | 1 | 1 | 1 | 1 | 1 | 1 |
| Initial |  |  |  |  |  |  |  |  |
| Transparency | ◎ | ◎~o | ◎ | o | ◎ | ◎ | ◎ | o |
| Gloss | o | ◎ | ◎ | ◎~o | ◎ | ◎ | ◎ | o |
| Appearance | ◎ | ◎ | ◎ | o | ◎ | o | ◎ | o~Δ |
| After boiling at 90° C., 500 hrs. |  |  |  |  |  |  |  |  |
| Transparency | ◎ | o | ◎ | o | o | ◎ | ◎ | o~Δ |
| Gloss | o | ◎ | ◎ | o | ◎ | ◎ | ◎ | Δ |

Visual evaluation:
◎ Excellent
o Good
Δ Below average
x Failure
Unsaturated polyester resin: Isophthalic acid type unsaturated polyester resin (styrene content: 40 weight %)

TABLE 2

|  | Ex. 8 | 9 | 10 | Comp. Ex. 2 |
| --- | --- | --- | --- | --- |
| Vinyl ester resin (e) | 100 |  | 30 |  |
| Vinyl ester resin (f) |  | 100 | 70 |  |
| Unsaturated polyester |  |  |  | 100 |
| Additives |  |  |  |  |
| Aluminum hydroxide | 150 | 150 | 100 | 150 |
| PercureHO | 1.5 | 1.5 | 1.5 | 1.5 |
| Percadox16 | 0.5 | 0.5 | 0.5 | 0.5 |
| Initial |  |  |  |  |
| Gloss | ○ | ⊙ | ⊙ | ○ |
| Appearance | ⊙ | ⊙ | ⊙ | ○ |
| After boiling at 90° C., 500 hrs. |  |  |  |  |
| Gloss | ○ | ○ | ⊙ | Δ |

Visual evaluation:
⊙ Excellent
○ Good
Δ Below average
x Failure
Unsaturated polyester resin: Isophthalic acid type unsaturated polyester resin (styrene content: 40 weight %)

EXAMPLE 11

In a 10 liter-four necked flask with a reflux condenser and a stirrer, 2244 g of epoxy resin (YD 128, produced by Tohto Kasei Co., Ltd., epoxy equivalent: 187) and 1032 g of methacrylic acid (produced by Mitsubishi Gas Chemical Company Inc.) were added in the presence of 3.5 g of hydroquinone and 3.0 g of benzyldimethyl amine and allow to react at 125° C. until the epoxy groups were reacted completely. After adjusting the temperature of the reaction mixture in the flask to 60° C., 1.0 g of dibutyltin dilaurate and 696 g of TDI (produced by Takeda Chemical Industries, Ltd.) were added and followed by completion of the reaction of isocyanate groups. Then, 98 g of maleic anhydride was added and reacted at 100° C., and 3616 g of styrene was added to give a vinyl ester resin composition (g).

In a 10 liter container, 5 kg of the composition (g), 7.5 kg of aluminum hydroxide (CWL325B, produced by Sumitomo Chemical Co., Ltd.), 1 g of parabenzoquinone, 50 g of t-butylperoxy benzoate, 200 g of zink stearate (ZNS-P, produced by Asahi Denka Kogyo K.K.) and 500 g of 10% carbon black toner (606BLK, produced by Daitai Kako Co., Ltd.) were mixed for 10 minutes by a high speed mixer. Thereto, 300 g of 24% MgO paste (thickening agent for Polymal, produced by Takeda Chemical Industries, Ltd.) was added and stirred for another 3 minutes. SMC was prepard by the use of the resin composition thus obtained and glass fibers of an inch long (S-30, produced by Nippon Electric Glass Co., Ltd.) so that the glass fibers made up 30% by weight. After the SMC was thickened and matured at 40° C. for 3 days, it was put in a flat mold, 300×300×8 mm in size and kept standing at 140° C., under 10 MPa for 7 minutes to obtain the test plates for evaluation of mechanical properties.

COMPARATIVE EXAMPLE 3

Test plates were prepared according to the manner in Example 11, wherein 5 kg of unsaturated polyester resin (9305Z, bisphenol A type unsaturated polyester resin, NV53, produced by Takeda Chemical Industries, Ltd.) instead of 5 kg of the composition (g). The evaluation results are shown in Table 3.

TABLE 3

|  | Example 11 | Comparative Example 3 |
| --- | --- | --- |
| Flexural Strength (23° C.) | 200 MPa | 170 MPa |
| (140° C.) | 100 MPa | 70 MPa |
| Strength retension (%)* | 75% | 60% |

*Strength retention after 3000 hours at 150° C.

Effect of the Invention

The vinyl ester resin composition of this invention can be thickened with alkaline earth metal oxides such as magnesium oxide when it is molded by compression or injection molding, and its degree of crosslinking can be raised moderately while keeping the viscosity of the composition low even when the composition is molded by cast molding and therefore, is high in productivity. In addition, the composition gives the cured products excellent in heat resistance, corrosion resistance, water resistance, boiling water resistance, gloss and thickening property.

What is claimed is:

1. A vinyl ester resin composition comprising;
    (A): a urethane modified vinyl ester resin, or (A'): a urethane modified acid addition vinyl ester resin obtained by the reaction of a part or all of hydroxyl groups in (A) with (B): a polybasic acid anhydride, and (C): a reactive monomer having at least one double bond in its molecule other than a (meth)acrylate having at least one hydroxyl group in its molecule, said (A) being prepared by reacting (F): a vinyl ester resin obtained by subjecting (D): an epoxy resin having 1.2 or more of an average number of epoxy groups in its molecule to addition reaction with (E): unsaturated monobasic acid and further reacting vinyl ester resin (F) with less than 50% by weight relative to the mixture of (F) and (G) with (G): (meth)acrylate having at least one hydroxyl group in its molecule and (H): a polyisocyanate component having 1.5 or more of an average number of polyisocyanate groups in its molecule, under the reaction conditions that an equivalent ratio of isocyanate groups in (H) to the total of hydroxyl groups in (F) and (G) (NCO/OH) is 0.01–1.2:1.

2. The vinyl ester resin composition of claim 1, wherein (D) is one having 1.5 to 3 of average number of epoxy groups in its molecule.

3. The vinyl ester resin composition of claim 1, wherein the epoxy group in (D) is glycidyl group.

4. The vinyl ester resin composition of claim 1, wherein (D) is a bisphenol epoxy resin.

5. The vinyl ester resin composition of claim 1, wherein (H) is one having 2 to 3.5 of average number of isocyanate groups in its molecule.

6. The vinyl ester resin composition of claim 1, wherein (E) is acrylic acid or methacrylic acid.

7. The vinyl ester resin composition of claim 1, wherein (G) is hydroxymethyl (meth)acrylate, hydroxyethyl (meth)acrylate, hydroxypropyl (meth)acrylate or glycerin di(meth)acrylate.

8. The vinyl ester resin composition of claim 1, wherein the resin composition further contains additives such as 0.1 to 5.0 parts by weight of a curing catalyst, 0.01 to 10 parts by weight of an internal mold release agent and 0 to 400 parts by weight of a filler relative to 100 parts by weight of the vinyl ester resin composition.

9. A sheet or bulk molding compound which comprises impregnating glass fiber with the vinyl ester resin composition claimed in claim 1 which further contains 0.1 to 5 parts by weight a curing catalyst, 0.01 to 10 parts by weight of an internal release agent, 0 to 400 parts by weight of a filler and 0.2 to 10 parts by weight of a thickening agent relative to 100 parts by weight of the vinyl ester resin composition.

10. A cured product obtained by curing the vinyl ester resin composition of claims 1, 8 or 9.

* * * * *